Figure 1:
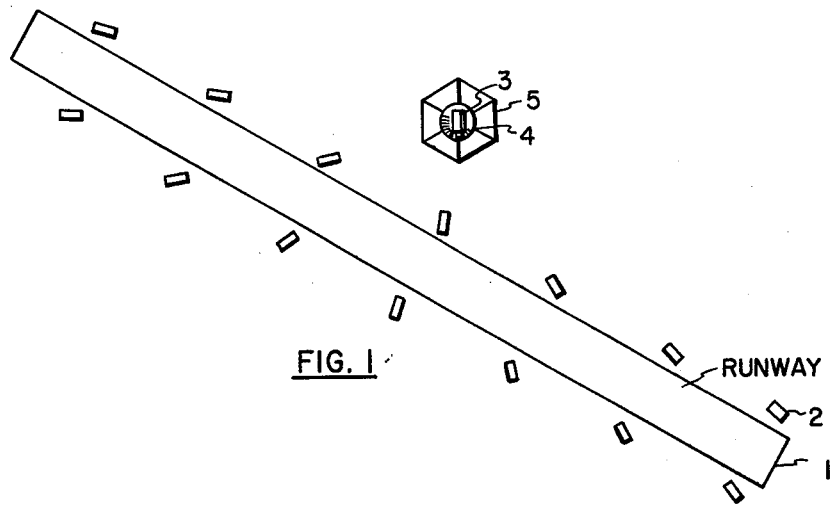

Oct. 16, 1962  A. C. RUDOMANSKI ET AL  3,058,346
SYSTEM FOR MEASUREMENT OF AIR TEMPERATURE AT GROUND LEVEL
Filed Nov. 4, 1960

*INVENTORS*
ANDREW C. RUDOMANSKI
RUSSELL D. DEWAARD
BY

*ATTORNEY*

3,058,346
SYSTEM FOR MEASUREMENT OF AIR TEMPERATURE AT GROUND LEVEL
Andrew C. Rudomanski, Stamford, and Russell D. De Waard, Old Greenwich, Conn., assignors to Barnes Engineering Company, Stamford, Conn., a corporation of Delaware
Filed Nov. 4, 1960, Ser. No. 67,272
6 Claims. (Cl. 73—355)

This invention relates to a system and method of determining at a distance the temperature of air near the ground over an extended area.

It is becoming increasingly important to measure rapidly temperature of air near the ground over extended areas. This problem is most acute in the case of runways on airports, and while the present invention is not limited to a system or method for use on airports it will be described in conjunction with the solution of this important practical problem. Air temperatures over runways are becoming more and more important with the advent of jets and other high speed aircraft where the density of the air is an important factor determining runway length or rather the load which a plane can safely carry when taking off from a runway of given length. The most important factor determining air density is temperature as this is a factor which is subject to the greatest variation in the shortest time. Another important factor is speed. It is not sufficient to know what the air temperature was half an hour before takeoff. The control tower and/or the pilot must know close to the instant of takeoff and thus maximum speed of obtaining measurements is of prime importance. Location of the measurement is also important. The temperature of the air near the runway can vary on a long runway and, of course, it is the temperature of the portions of the runway near the point at which a plane becomes airborne which are of greatest interest.

The problem is not insoluble by ordinary means as it is perfectly feasible technically to locate a series of temperature sensors in the air at different points along the runway. However, if the measurements are to be obtained immediately there must be a connection from every one of these sensors to the point at which the measurements are to be interpreted or used which will usually be the control tower. This requires a vast network of electrical wires or other means for transmitting the measurement to a central location and the cost becomes enormous for a large airport. Also, the problem of maintenance can be a formidable one as the whole length of the transmission channel from each sensor to the central location must be kept in perfect functioning order at all times. For this reason and because of the great cost no such installations have been considered practical although they are technically possible.

The present invention solves the problem simply, cheaply and with a reliability which is very high. Instead of providing temperature sensing elements which transform temperature into an electrical signal black bodies or similar radiators are dispersed along to the runway and are successively observed at a central location or several central locations by aimable infrared radiometers. Radiometers themselves are of standard design and may be manually operated on a fixed table suitably calibrated so that it is known at any instant which infrared radiator is being observed. Automatic operation by having the radiometer scan through the whole arc of the radiators along the runway is also practical and permits making a continuous record. This is a scanning problem which presents rather modest requirement in comparison to other scanning problems involving the use of infrared radiation. In general, the scan can be quite slow and all that is needed is that during scanning the radiometer is at all times accurately aimed which may involve small changes in altitude aiming as well as azimuth. These can be effected very simply by suitable cam surfaces. Of course, when manual operation is used the radiometer may be provided with a simple sighting instrument, and aimed in each case successively at the particular radiators from which a temperature measurement is desired.

While it is true, as pointed out above, that radiometers of standard design may be used in the present invention they do require certain characteristics which are, however, easy to obtain. The radiometer must have a very small field of view so that it sees successively only the temperature response of radiators and not a considerable amount of background. Also, in general it is necessary to provide simple filtering means which eliminate very short wave radiation so that reflections from sunlight or other similar factors do not introduce spurious signals and which also eliminate wavelength regions where there are string absorption bands of atmospheric gases. Filters rejecting the radiation from atmospheric gases are readily obtainable.

While the radiometer used does not significantly depart from standard good infrared design the temperature radiators themselves must satisfy some quite stringent requirements. It is essential that the temperature radiators assume the temperature of the air and are not affected by other factors, particularly radiations. This sets some severe limitations on the radiator design although fortunately, once they are realized, the limitations can be easily and cheaply met. The requirement that the radiator be influenced but little, if at all, by outside radiations requires that it be housed in a suitably insulated housing and that its radiation is not substantially affected by outside radiation not in the line of sight to the control tower. The radiators are oriented so that their radiations are directed to a single point which is the radiometer in the control tower. Secondly, it is necessary that the radiators be exposed rapidly to the surrounding air so that they assume the temperature thereof almost immediately. Suitable ventilation is not difficult to provide and shielding of the radiators from other radiations such as the sun is easily effected by sun shades, radiator geometry and the like.

It will be seen that the present invention represents an entirely passive system. All the radiator has to do is to sit at its location and radiate in accordance with its temperature along the very narrow path visible to the radiometer in the control tower. None of the problems of active systems or systems which require electrical transmission over long distances are involved. About the only conditions which can interfere with the operation of the present invention are big snowdrifts over the radiators which precludes runway operation in any event or heavy rain. Even the latter will not necessarily interfere because the sensitivity of radiometers is so high it is generally possible to get through sufficient energy for some response. The operator in the control tower can see whether the intervening space to particular radiators are in the path of heavy precipitation. If this occurs over only part of the runway the signals obtained will show this up indirectly as an abnormally low reading for a certain part of the runway.

The infrared radiations give measurements which are nearly instantaneous and so it is possible to obtain measurements or a graph of air temperatures along a runway at very short intervals. With automatic scanning the intervals may be as low as a second. This extreme speed is of great practical importance for it is possible for the control tower to alert a pilot of any change even during takeoff. This introduces a great safety factor which may be taken advantage of in various ways. If the airport is used to maximum limits the safety is increased and at the same safety it is possible to allow a smaller margin. With the enormous fuel consumption of jets this can be a very real economic factor.

Figure 2:
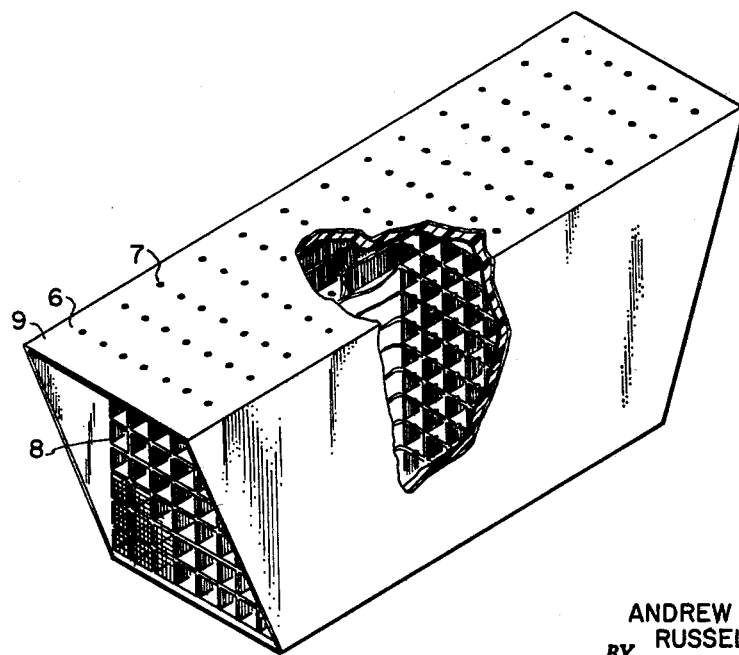

The invention will be described in greater detail in conjunction with the drawings in which:

FIG. 1 is a plan diagrammatic view of an airport runway and control tower with the system of the present invention installed, and FIG. 2 is an isometric view of a temperature radiator and housing, partly broken away.

In FIG. 1 a runway is shown at 1 with infrared radiators 2 arranged along its edges. It will be noted that these radiators are all oriented so that they point toward a central location at the control tower 5 in which a radiometer 3 receives radiation successively from the radiators and turns on a calibrated table 4. As FIG. 1 is diagrammatic in nature the orientation of the radiators is shown by representing them as narrow rectangles oriented in the direction in which their radiations can be seen.

As shown in FIG. 2 each radiator is housed in an insulated housing 6 provided with ventilation holes 7 so that a continuous flow of air is provided. The radiator itself is a honeycomb 8 of long blackened channels through which air passes freely. The construction is similar to an egg crate but the individual channels are much longer in proportion to their size. As a result the radiator radiates infrared over a narrow angle, and its total radiation is not significantly affected by outside radiation striking their front from a direction out of the line of sight to the control tower. A suitable sun shade 9 is provided so that even the face of the radiators is not exposed to strong radiations unnecessarily. The material of the honeycomb is of good heat conductivity and low heat capacity such as thin aluminum, the inside surfaces being blackened as mentioned above. As a result the flow of air through the ventilating holes and the channels results in the radiator assuming the temperature of the surrounding air rapidly. At the same time the multiple reflections of the long honeycomb channels make the radiator a very close approximation of a black body.

As is indicated in FIG. 1 all of the radiators are aligned so that radiations from them converge on the radiometer in the control tower or other central point but the radiators are at a very small angle to the line of sight so that the radiometer cannot quite see all the way through them. Since the radiators are not affected by other radiations they give a very close approximation to the radiation of a black body at the temperature of the surrounding air. The honeycomb construction shown in FIG. 2 is the best and simplest form of narrow angle black body radiators. It is, therefore, preferred. However, in its system aspect the invention is not limited to radiators of this construction and any other form which will result in a radiator that radiates similar characteristics which rapidly assumes the temperature of the surrounding air may be used.

We claim:

1. A process of measuring the temperature of the air in rapid succession at a plurality of points adjacent to the ground over a portion of a large area which comprises placing objects behaving as infrared radiators of substantially equal emissivity at points adjacent to the ground where the temperature of the air is to be measured, shielding the said radiators from radiation except from a predetermined narrow angle oriented so that the angles from the various radiators substantially intersect at a central point in the large area, exposing the radiators to continuous contact with the atmosphere so that each radiator assumes the temperature of the adjacent atmosphere and observing successively the radiations from the radiators at the central point by means of an infrared radiometer having a small field of view to receive radiation primarily from each of the radiators in succession.

2. A process according to claim 1 in which the large area is an airport, the radiators are arranged adjacent at least one runway and the central point is a control tower.

3. A system for the successive measurement of the temperature of the air adjacent the ground at a plurality of points adjacent a portion of a ground area comprising in combination a plurality of infrared radiators of equal emissivity adjacent to the area, each radiator radiating over a narrow angle, means in each housing for exposing the infrared radiator to the surrounding atmosphere while shielding it from radiations outside its radiation angle all of the radiators oriented so that the narrow beams of infrared radiation from the radiators converge on a single predetermined point, an infrared radiometer with narrow field of view located at said point, means for accurately and successively aiming said radiometer at each of the infrared radiators and means for transforming the radiometer response into a function of temperature of the infrared radiators.

4. A system according to claim 3 in which the radiators are honeycombs with long parallel channels oriented to radiate substantially along the line of sight to the point.

5. A system according to claim 3 in which the infrared radiators are arranged along the edges of an airport runway and the central point at which the radiometer is located is in the control tower.

6. A system according to claim 3 in which the housings of the radiators are provided with means for producing a full flow of surrounding air over the radiators.

References Cited in the file of this patent

UNITED STATES PATENTS 1,158,967    Bellinghan _____ Nov. 2, 1915

OTHER REFERENCES

Publication, "Journal of Scientific Instruments," article a "Thermocouple Anemometer," Vol. 32, April 1955, pages 145–147. A copy is available in the Scientific Library U.S. Patent Office.